(12) United States Patent
Theobald

(10) Patent No.: US 11,158,008 B2
(45) Date of Patent: Oct. 26, 2021

(54) MOBILE ROBOT FOR PERFORMING HOSPITALITY SERVICE(S) FOR GUEST(S) OF A HOSPITALITY BUSINESS

(71) Applicant: Vecna Robotics, Inc., Waltham, MA (US)

(72) Inventor: Daniel Theobald, Somerville, MA (US)

(73) Assignee: Vecna Robotics, Inc., Waltham, MA (US)

( * ) Notice: Subject to any disclaimer, the term of this patent is extended or adjusted under 35 U.S.C. 154(b) by 54 days.

(21) Appl. No.: 16/806,116

(22) Filed: Mar. 2, 2020

(65) Prior Publication Data

US 2020/0198150 A1 Jun. 25, 2020

Related U.S. Application Data

(63) Continuation of application No. 14/525,971, filed on Oct. 28, 2014, now abandoned, which is a continuation of application No. 13/851,237, filed on Mar. 27, 2013, now Pat. No. 10,482,550.

(51) Int. Cl.

| *G06Q 50/12* | (2012.01) |
|---|---|
| *B25J 11/00* | (2006.01) |
| *B25J 5/00* | (2006.01) |
| *G06Q 10/02* | (2012.01) |
| *G06Q 30/00* | (2012.01) |

(52) U.S. Cl.
CPC ............ *G06Q 50/12* (2013.01); *B25J 5/007* (2013.01); *B25J 11/008* (2013.01); *G06Q 10/02* (2013.01); *G06Q 30/016* (2013.01); *Y10S 901/01* (2013.01)

(58) Field of Classification Search
None
See application file for complete search history.

(56) References Cited

U.S. PATENT DOCUMENTS

| 5,287,269 | A | 2/1994 | Dorrough |
|---|---|---|---|
| 7,784,570 | B2 * | 8/2010 | Couture .................. B25J 5/005 180/9.1 |
| 9,720,414 | B1 | 8/2017 | Theobald |
| 2003/0132289 | A1 | 7/2003 | Jacobi et al. |
| 2004/0093650 | A1 * | 5/2004 | Martins .................... B25J 5/007 180/167 |
| 2005/0216126 | A1 | 9/2005 | Koselka et al. |
| 2006/0043761 | A1 * | 3/2006 | Harcourt .................. B60J 11/00 296/136.02 |
| 2006/0111814 | A1 | 5/2006 | Hachitani et al. |
| 2006/0195225 | A1 | 8/2006 | Aoki et al. |
| 2007/0276540 | A1 | 11/2007 | Okuda et al. |
| 2008/0300926 | A1 | 12/2008 | Di Costanzo et al. |
| 2010/0217438 | A1 | 8/2010 | Kawaguchi et al. |
| 2010/0234995 | A1 | 9/2010 | Zini |
| 2013/0231779 | A1 * | 9/2013 | Purkayastha .......... B25J 9/1697 700/259 |

(Continued)

OTHER PUBLICATIONS

"George Jetson, Your Room is Ready", NY Times, May 2011; Neil Genzlinger (Year: 2011).*

(Continued)

*Primary Examiner* — Dennis W Ruhl

(57) ABSTRACT

Mobile robots and methods involving mobile robots are provided. In one method, a mobile robot performs a hospitality service for a guest of a hospitality business. The mobile robot is operated at the hospitality business.

9 Claims, 9 Drawing Sheets

(56) References Cited

U.S. PATENT DOCUMENTS

2014/0365258 A1* 12/2014 Vestal ............ G06Q 10/063114
705/7.15

OTHER PUBLICATIONS

"BellBot-A Hotel Assistant System Using Mobile Robots"; Lopez et al.; International Journal of Advanced Robotc Systems; Jan. 2013 (Year: 2013).*

Unwinding with Ursula, Philadelphia Inquirer, Mar. 1990, Fred Tasker, 2 pages.

Fitzpatrick, Michael, "Technology: Inside IT: The rise of the plastic porters: A hospital in Japan is pioneering the use of autonomous robots to replace human workers", The Guardian, London, UK, Nov. 2, 2006, 2 pages.

* cited by examiner

MOBILE ROBOT FOR PERFORMING HOSPITALITY SERVICE(S) FOR GUEST(S) OF A HOSPITALITY BUSINESS

RELATED APPLICATIONS

The present application is a continuation of U.S. patent application Ser. No. 14/525,971, filed Oct. 28, 2014, now abandoned, which is a continuation of U.S. patent application Ser. No. 13/851,237, filed Mar. 27, 2013 and entitled "Mobile Robot For Performing Hospitality Service(s) For Guest(s) of a Hospitality Business", now U.S. Pat. No. 10,482,550, which are hereby incorporated herein by reference in their entireties.

BACKGROUND OF THE INVENTION

1. Field of the Invention

The present invention relates generally to a mobile robot and, more particularly, to performing a hospitality service for a guest of a hospitality business.

2. Introduction

Hospitality businesses typically provide various hospitality services for its guests including, for example, a guest check in service, a guest check out service, a porter service, a concierge service, an article delivery service, and a housekeeping service to name a few. These services can be quite costly and some employees may be physically unable to repeatedly perform some services such as, for example, portering relatively heavy luggage.

There is a need in the art for an apparatus and method for performing or assisting in the performance of a hospitality service for a guest of a hospitality business.

SUMMARY

Mobile robots and methods involving mobile robots are provided. In one method, a mobile robot performs a hospitality service for a guest of a hospitality business. The mobile robot is operated at the hospitality business. The mobile robot, for example, may operate inside of, outside of, and/or otherwise on and/or near a premises of the hospitality business.

BRIEF DESCRIPTION OF THE DRAWINGS

The following detailed description will be better understood when read in conjunction with the appended drawings, in which there is shown one or more embodiments of the present disclosure. It should be understood, however, that the various embodiments of the present disclosure are not limited to the precise arrangements and instrumentalities shown in the drawings.

DETAILED DESCRIPTION

Figure 1:
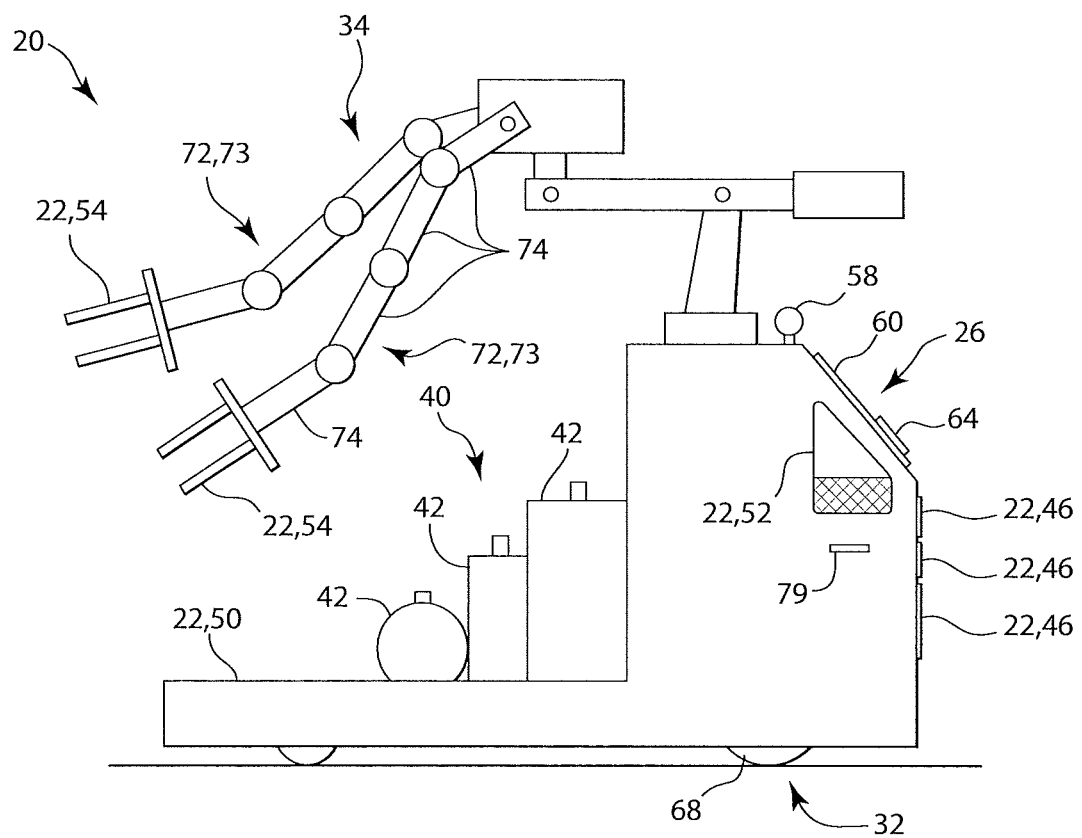
FIG. 1 is an illustration of an embodiment of a mobile robot.

FIG. 1 is an illustration of a mobile robot 20 adapted to perform one or more hospitality services for one or more paying and/or non-paying guests (e.g., clients, patrons, customers, etc.) of a hospitality business. An example of a hospitality business is a lodging business such as, for example, a resort, a hotel, a motel, an inn, or any other type of business that provides temporary lodging. Other examples of a hospitality business may include, but are not limited to, a cruise line, a railroad station, a bus station, a restaurant, a bar, a spa, hospital, college, government building or facility a theme park, an arena and a stadium or any other similar type of enterprise in need of the services described herein.

The mobile robot 20 may perform various types of hospitality services such as, for example, those generally provided by or on a premises of the hospitality business (e.g., a hotel). The mobile robot, for example, may check a guest into and/or out of the hospitality business. The mobile robot may porter luggage for a guest of the hospitality business. The mobile robot may perform a concierge service for a guest of the hospitality business. The mobile robot may perform a room delivery service for a guest of the hospitality business such as, for example, room service, linen service, etc. The mobile robot may perform a housekeeping service for a guest and/or at a room of the hospitality business. The mobile robot, of course, may also or alternatively perform various types of hospitality services other than those described above.

The mobile robot 20 may be configured as an autonomous mobile robot that performs one or more tasks without continuous outside control and/or intervention. The mobile robot, for example, may receive instructions to perform a certain task at a certain location such as, for example, to perform a hospitality service (e.g., porter luggage) for an individual (e.g., a guest of a hospitality business). The mobile robot may subsequently determine and perform the operation(s) necessary to complete the task based on, for example, its current location, surrounding obstacles, its operating environment, the type of task to be perforated, etc. The mobile robot may also adapt to unknown, new and/or changing operating environments without additional outside control and/or intervention.

The mobile robot 20 may be fully autonomous during performance of one or more tasks. The mobile robot 20 may also or alternatively be semi-autonomous during performance of one or more tasks. The mobile robot 20 may also or alternatively be (e.g., remote) controlled by an operator (e.g., a human controller) during performance of one or more tasks.

The term "fully autonomous" may be used to describe an apparatus that performs one or more tasks without, for example, any outside control and/or intervention. A fully autonomous mobile robot, for example, may perform a task without receiving instructions (e.g., vectors, commands, etc.) from a human operator during performance of the task.

The tent' "semi-autonomous" may be used to describe an apparatus that performs one or more tasks without, for example, continuous outside control. A semi-autonomous mobile robot, for example, may perform a task utilizing one or more periodic instructions from an operator (e.g., a human controller) that bound and/or qualify the performance of the task. The instructions may provide, for example, an updated location of where the task is to be perforated, identify an unknown obstacle, control the scope of the task, control when the task should be perforated, etc.

Figure 2:
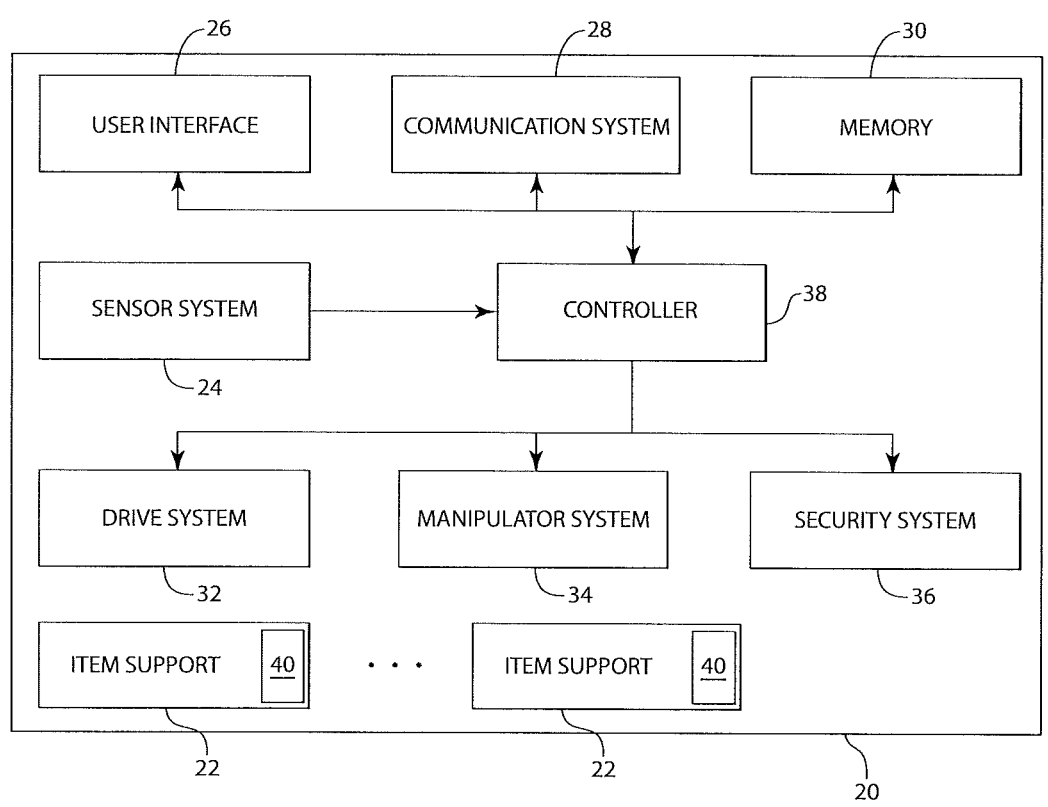
FIG. 2 is a block diagram of the mobile robot.

FIG. 2 is a block diagram of the mobile robot 20. The mobile robot 20 includes one or more item supports 22. The mobile robot 20 also includes a sensor system 24, a user interface 26, a communication system 28, memory 30, a drive system 32, a manipulator system 34, a security system 36 and a controller 38.

Figure 3:
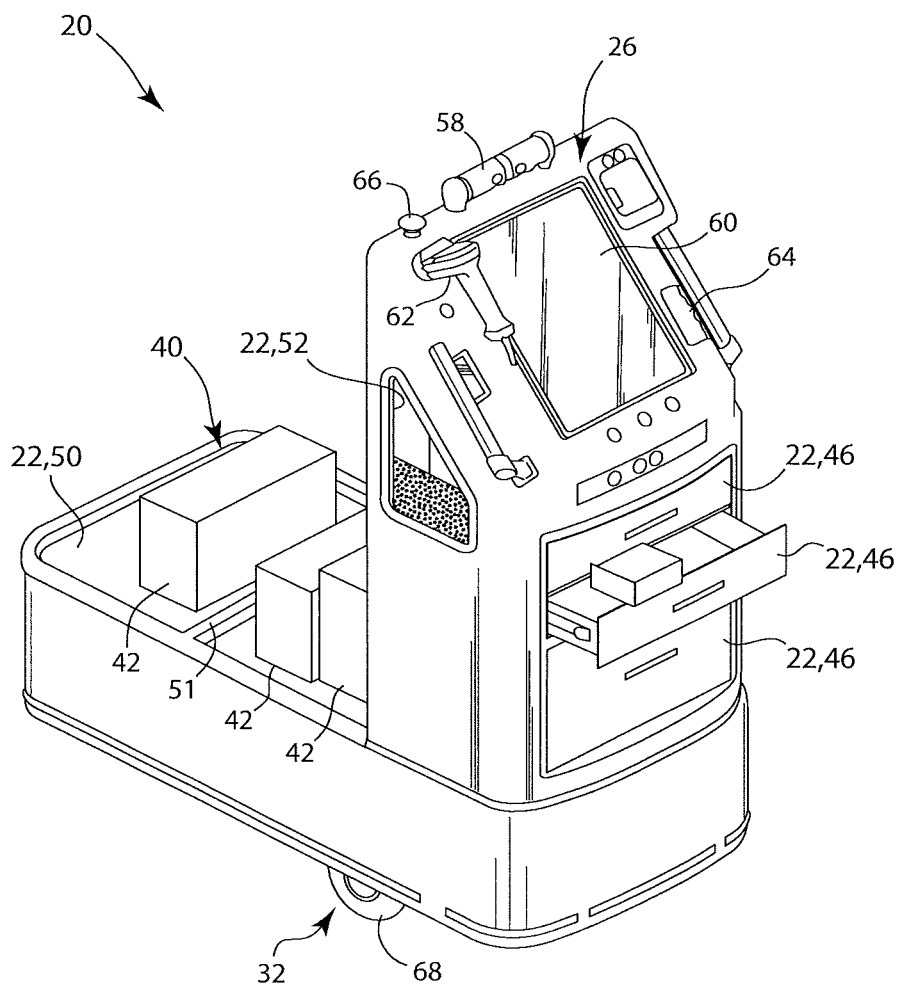
FIG. 3 is a perspective illustration of another embodiment of the mobile robot.

Referring to FIGS. 1 to 3, each of the item supports 22 is adapted to securely or accessibly hold, contain and/or otherwise support one or more items 40 such as, for example, luggage 42 and/or hospitality service articles 44 (see FIG. 3). Examples of a parcel of luggage 42 include, but are not limited to, a suitcase, a briefcase, a garment bag, a duffle bag, a backpack, a tote bag, a purse, a case, a trunk and a chest. Examples of hospitality service articles 44 include, but are not limited to, toiletries, linens, food, beverages, room keys and stationary. Examples of a toiletry include, but are not limited to, soap, shampoo, conditioner, shaving cream, a razor, toothpaste, a tooth brush, a comb and moisturizer. Examples of linens include, but are not limited to, sheets, pillow cases, blankets and towels.

Figure 4:
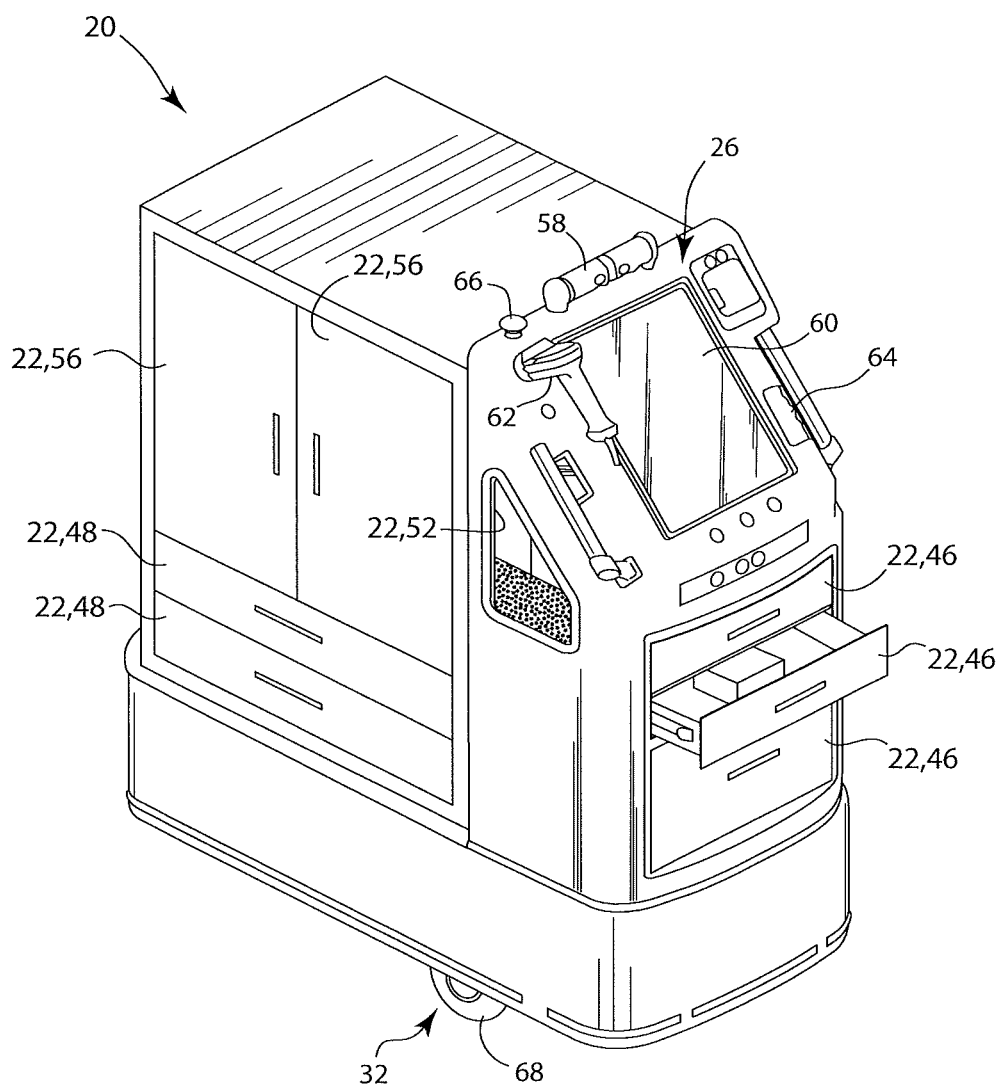
FIG. 4 is a perspective illustration of another embodiment of the mobile robot.

One or more of the item supports 22 may each be configured as a drawer 46 and 48 (see FIG. 4). At least one of the item supports 22 may be configured as a platform 50 such as, for example, a deck or a bed. The platform 50 may be configured as an open platform as illustrated in FIG. 1. Alternatively, the platform may be configured with at least one divider 51 as illustrated in FIG. 3, which divider 51 may visually and/or physically separate the luggage of one guest from the luggage of another guest. At least one of the item supports 22 may be configured as a compartment 52 such as, for example, a cubby or a pocket. One or more of the item supports 22 may each be configured as a component 54 (e.g., an end effector) of the manipulator system 34 (see also FIG. 5). Referring to FIG. 4, one or more of the item supports 22 may each be configured as a cabinet with at least one cabinet door 56.

The mobile robot 20 may also or alternatively include one or more item supports 22 with a configuration other than those described above and illustrated in the drawings. For example, at least one of the item supports 22 may be configured with a seat such as, for example, a bench or a chair. This seat may be located on or adjacent the platform 50. In this manner, the mobile robot 20 may drive one or more guests around the hospitality business, for example, while also performing another task such as portering luggage for the guests.

Referring to FIG. 2, the sensor system 24 is adapted to survey an operational environment of the mobile robot 20; e.g., the environment of the hospitality business. The sensor system 24 is also or alternatively adapted to receive location data indicative of a location of the mobile robot 20 and/or location(s) of other object(s) within the operating environment.

The sensor system 24 includes one or more locator sensors. These locator sensors may be operated to spatially locate (e.g., triangulate) the mobile robot 20 relative to, for example, its surrounding environment, its geographic location, and/or one or more locators (e.g., RF tags, physical landmarks, etc.). Examples of a locator sensor include, but are not limited to, a proximity sensor, a global positioning system (GPS) receiver, a radar system, an infrared system, a laser system, a radio transceiver, and a visual location system with a camera 58.

Referring to FIGS. 2 and 3, the user interface 26 is adapted to receive information from an individual such as, for example, a guest of the hospitality business. The user interface 26 is also adapted to present information to the individual. The user interface 26, for example, may visually and/or tactilely display a message to the individual. The user interface 26 may also or alternatively audibly reproduce a message for the individual.

The user interface 26 may include a display such as, for example, a visual display screen 60 (e.g., a liquid crystal display (LCD) screen), a tactile display device (e.g., a Braille display), or a printer (e.g., a laser printer, an inkjet printer, a thermal printer, etc.). The user interface 26 may include an electro-acoustic transducer such as, for example, an audio speaker and/or a microphone connected to a voice control system. The user interface 26 may include a security device such as, for example, a bio-information sensor, a voice recognition system, a barcode scanner 62 (see FIG. 3), a microchip (e.g., security chip) reader, a card reader 64, etc. Examples of a bio-information sensor include, but are not limited to, an eye retinal sensor, a fingerprint sensor and a handprint sensor. The user interface 26 may also or alternatively include the camera 58, a touch screen (e.g., the screen 60), a keypad, a keyboard, and/or any other type of user interface device.

Referring to FIG. 2, the communication system 28 is adapted to receive data from a remote computer system. The communication system 28 is also or alternatively adapted to send data to the remote computer system. The communication system 28 may include a cellular, satellite and/or radio receiver 66 and a cellular, satellite and/or radio transmitter 66 (see FIG. 3).

The memory 30 may be a non-transitory computer readable medium, and configured to store software (e.g., program instructions) for execution by the controller 38. The memory 30 may include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The drive system 32 is adapted to move the mobile robot 20 within its operating environment; e.g., inside and/or outside of the hospitality business. The drive system 32 includes one or more motorized and/or steerable propulsion devices. The drive system 32 of FIGS. 1, 3 and 4, for example, includes a plurality of motorized drive wheels 68. The drive system 32 of FIG. 5 includes a plurality of motorized (e.g., robotic and multi-linkage) track systems 70. The drive system 32 may also or alternatively include one or more propulsion devices with configurations other than those described above and illustrated in the drawings.

Referring to FIG. 1, the manipulator system 34 includes one or more manipulators 72. These manipulators 72 are adapted to move, or assist with the movement of, one or more of the items 40 onto or into one or more of the item supports 22. The manipulators 72 are also or alternatively adapted to move, or assist with the movement of, one or more of the items 40 off or out of one or more of the item supports 22.

One or more of the manipulators 72 may each be configured as a robotic manipulator aim 73. Each manipulator arm 73 may be electronically, hydraulically, pneumatically and/or mechanically actuated. Each manipulator arm 73 includes the end effector 54, which is connected to one or more aim members 74 (e.g., linkages). Examples of an end effector include, but are not limited to, a gripping device, a suction device, an electromagnet, a winch, a clasp, etc.

Figure 6:
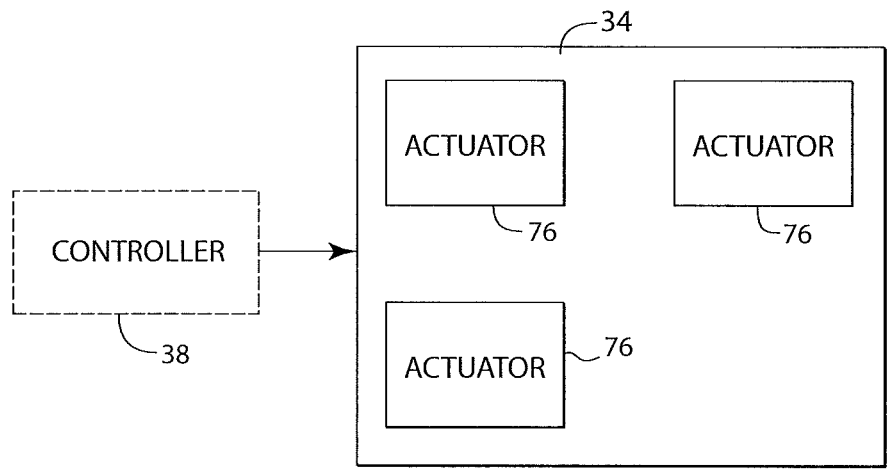
FIG. 6 is a block diagram of a manipulator system for the mobile robot of FIG. 2.

Referring to FIGS. 1 and 6, one or more of the manipulators 72 may each be configured as a robotic drawer. Each robotic drawer includes one of the drawers 46 and at least one actuator 76, which is adapted to open and/or close the drawer 46. Examples of an actuator include, but are not limited to, an electric motor, a hydraulic or pneumatic pump, and a hydraulic cylinder.

Referring to FIG. 4, one or more of the drawers 48 may each be configured as a robotic drawer. One or more of the cabinet doors 56 may be configured as a robotic cabinet door. For example, each drawer 48 may be opened and/or closed with at least one respective actuator. Each cabinet door 56 may be opened and/or closed with at least one respective actuator. Alternatively, one or more of the drawers 46 and 48 and/or one or more of the cabinet doors 56 may each be configured as a manual drawer or cabinet door.

The manipulator system 34 may also or alternatively include various types of manipulators other than those described above and illustrated in the drawings. For example, one or more manipulators may each be configured as a pallet jack, a lift platform, a conveyor system, a slide carriage or a crane. Other examples of manipulators are disclosed in U.S. Pat. Nos. 7,902,784, 7,719,222 and 7,348,747, each of which is hereby incorporated herein by reference in its entirety.

Figure 7:
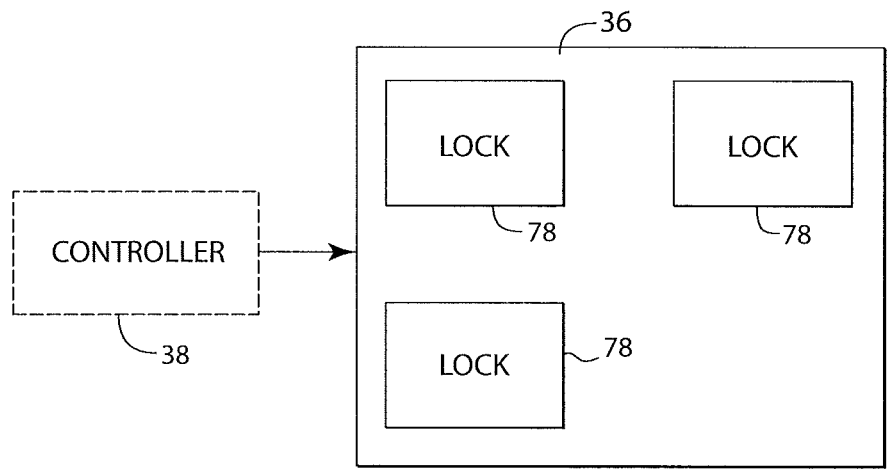
FIG. 7 is a block diagram of a security system for the mobile robot of FIG. 2.

Referring to FIGS. 1 and 7, the security system 36 is adapted to secure the item(s) 40 with (e.g., on or within) at least one of the item supports 22. The security system 36, for example, may include one or more electronically, hydraulically, pneumatically and/or mechanically actuated locks 78 such as, for example, a bolt or a latch. One or more of these locks 78 may each be adapted to secure a respective one of the drawers 46 in a closed position. In this manner, unauthorized individuals may be unable to access the item(s) 40 within the drawers 46. Similarly, referring to FIG. 4, one or more of the drawers 48 and/or one or more of the cabinet doors 56 may also or alternatively each be securable with at least one electronically, hydraulically, pneumatically and/or mechanically actuated lock.

Figure 5:
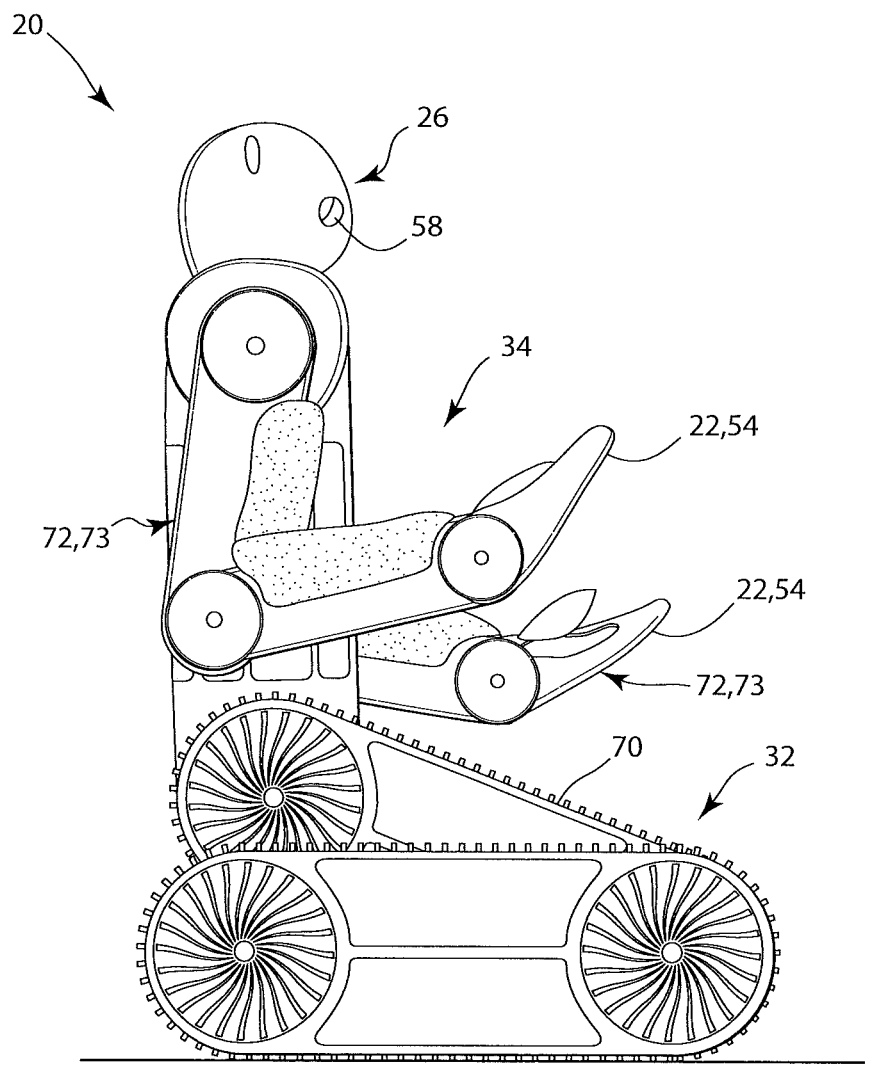
FIG. 5 is an illustration of another embodiment of the mobile robot.

Referring to FIGS. 1 and 5, the security system 36 may include one or more of the end effectors 54. For example, each end effector 54 may grip an item 40 to secure that item 40. Each end effector 54 may subsequently release the gripped item 40 to provide access to the item 40. The item 40 may be released, for example, by reducing clamping pressure on the item 40. Alternatively, the item 40 may be released by disengaging (e.g., letting go of or dropping) the item 40.

The security system 36 may also or alternatively include one or more security devices other than those described above and illustrated in the drawings. For example, the security system 36 may include one or more manually operated locks; e.g., a key lock, a combination lock, a pad lock, etc. In another example, the security system 36 may include one or more of the security devices disclosed in U.S. patent application Ser. No. 13/587,098 entitled "Method and Device for Accommodating Items" which is hereby incorporated herein by reference in its entirety.

Referring to FIG. 2, the controller 38 is in signal communication (e.g., hardwired or wirelessly connected) with the sensor system 24, the user interface 26, the communication system 28, the memory 30, the drive system 32, the manipulator system 34 and the security system 36. The controller 38 may be implemented with hardware, or a combination or hardware and software. The controller 38 may include one or more single or multi-core processors, analog and/or digital circuitry, etc.

Figure 8:
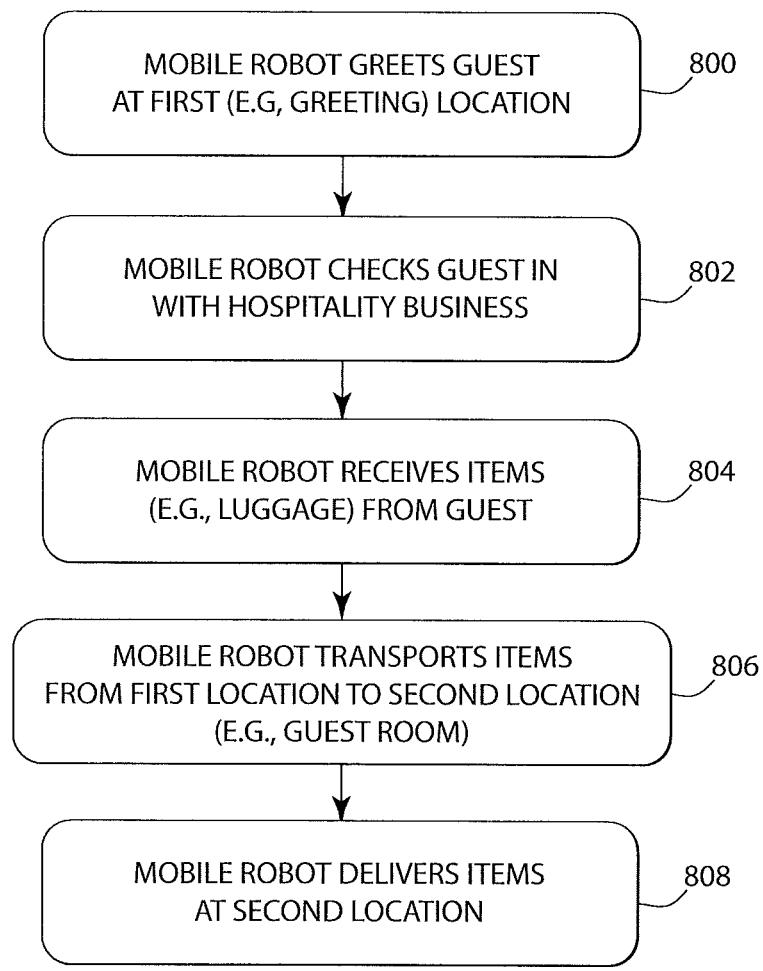
FIG. 8 is a flow diagram of a method for operating the mobile robot.
Figure 9:
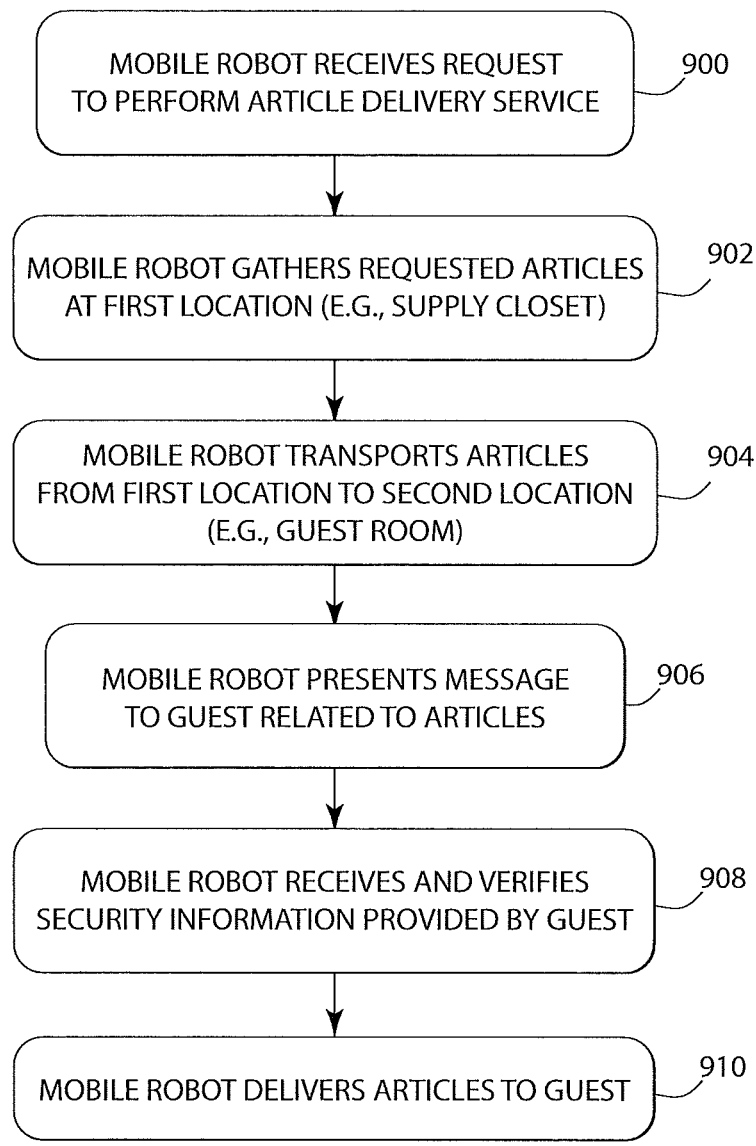
FIG. 9 is a flow diagram of another method for operating the mobile robot.
Figure 10:
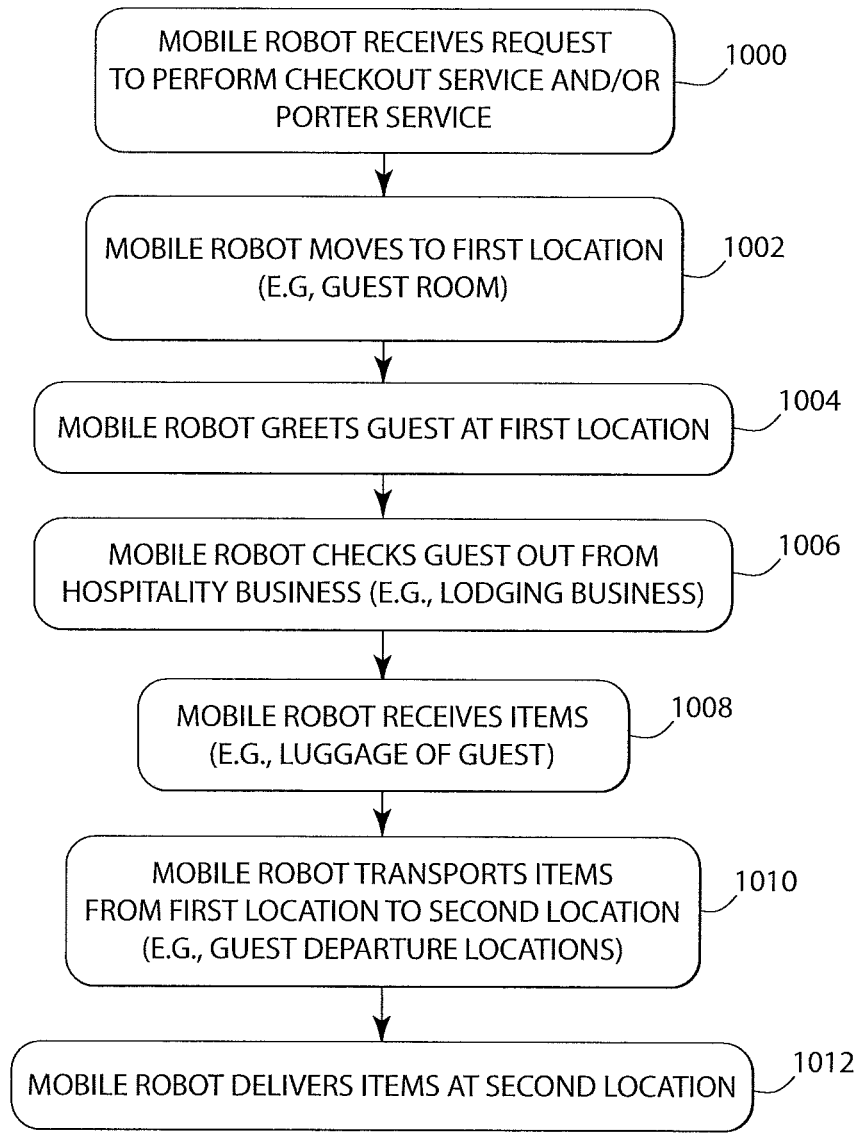
FIG. 10 is a flow diagram of another method for operating the mobile robot.

The mobile robot 20, as set forth above, may perform various hospitality services for at least one guest of a hospitality business. Methods for performing such hospitality services are described below with reference to FIGS. 8 to 10. For example, FIG. 8 is a flow diagram of a method in which one or more check in and porter services are performed for at least one guest arriving at a lodging business (e.g., a hotel). FIG. 9 is a flow diagram of a method in which at least one room delivery service is performed for at least one guest during his/her stay at a lodging business. FIG. 10 is a flow diagram of a method in which one or more check out and porter services are performed for at least one guest departing from a lodging business. Although the methods of FIGS. 8 to 10 are described in relation to a lodging business, the mobile robot 20 may perform these methods at any other type of hospitality business.

Check in & Porter Services

In step 800 of the method of FIG. 8, the mobile robot 20 greets the guest at a greeting location. The greeting location may be inside of the lodging business near, for example, a main entrance or a front desk of the lodging business. Alternatively, the greeting location may be outside of the lodging business near, for example, the main entrance or a guest drop off location. Still alternatively, the mobile robot 20 may meet the guest near his/her vehicle in a parking lot of the lodging business.

The controller 38 may receive sensor data from the sensor system 24 that indicates the guest is approaching or has arrived at the greeting location. Alternatively, the controller 38 may receive a prompt through the user interface 26 or the communication system 28 from, for example, a staff member of the lodging business to greet the guest. Upon receiving the sensor data or the prompt, the controller 38 may signal the user interface 26 to present a message to the guest. This message may be presented visually using the display screen 60. The message may also or alternatively be presented audibly using the speaker of the user interface 26. The message may include a greeting and/or provide directions on how to check in with the lodging business using the mobile robot 20.

In step 802, the mobile robot 20 checks the guest in with the lodging business. The controller 38, for example, may receive check in information from the guest through the user interface 26. The guest may input this check in information using the touch screen 60, the card reader 64 and/or verbally through the microphone of the user interface 26. Alternatively, the guest may input the check in information using another electronic device (e.g., a mobile phone, a personal digital assistance (PDA), etc.), which sends the check in information to the communication system 28.

The check in information may include guest identification (ID) information, guest order information, guest payment information, and/or any other type of information. The guest identification information may include, but is not limited to, a name of the guest, ID card (e.g., driver license) information for the guest, passport information for the guest, a permanent address of the guest, and a license plate number of the guest's vehicle. The guest order information may include, but is not limited to, one or more services the guest ordered or would like to receive at the lodging business, an estimated length of stay of the guest, and an estimated departure time and/or date for the guest. The guest payment information may include, but is not limited to, the guest's credit card number, the guest's debit card number and pin, and the guest's charge account number and/or pin.

The controller 38 may store the check in information in the memory 30. The controller 38 may also or alternatively send check in data to a remote computer system, for example, to update a central database for the lodging business. The check in data may be indicative of at least some of the check in information. The check in data may also or alternatively be indicative of an approximate time of arrival of the guest at the lodging business; e.g., when the guest began the check in process with the mobile robot 20.

The mobile robot 20 may issue the guest a key (e.g., mechanical key, an electronic key, a keycard, etc.) to a lock for a room assigned to the guest (guest room) at the lodging business. The controller 38, for example, may signal the manipulator system 34 to open one of the drawers 46 which holds blank keycards (e.g., the article 46 of FIG. 3). The guest may remove one of the keycards and swipe it through the card reader 64 after receiving a prompt to do so from the user interface 26. The card reader 64 may encode the swiped keycard with a combination to the lock for the guest room. The controller 38 may subsequently signal the manipulator system 34 to close the drawer 46 to prevent un-authorized individuals from accessing the remaining keycards.

In other embodiments, the mobile robot 20 may include an automated keycard dispenser. This keycard dispenser may dispense the keycard through a slot 79 in a body of the mobile robot 20 in response to receiving a signal from the controller 38. The dispensed keycard may be blank or pre-encoded with the combination to the lock for the guest room. Alternatively, the keycard dispenser may encode the keycard with the combination to the lock for the guest room before being dispensed through the slot 79.

In step 804, the mobile robot 20 receives one or more parcels of the guest's luggage 42. The guest, for example, may place his/her luggage 42 onto the platform 50. Alternatively, the mobile robot 20 may autonomously gather the luggage 42. For example, the controller 38 may signal the manipulator system 34 to pick up the luggage 42 with one or more of the manipulator arms 73 using data received from the sensor system 24. The controller 38 may also or alternatively signal the manipulator system 34 to pick up the luggage using command data received through the communication system 28. The controller 38 may subsequently signal the manipulator system 34 to place the luggage 42 onto the platform 50. Alternatively, the end effectors 54 may continue to hold the luggage 42 where, for example, the platform 50 is substantially full or the mobile robot 20 does not include a platform as illustrated in FIG. 5.

In step 806, the mobile robot 20 transports the luggage 42 from the greeting location to the guest room. The controller 38, for example, may signal the drive system 32 to autonomously move the mobile robot 20 through the lodging business to the guest room using data received from the sensor system 24. The controller 38 may also or alternatively signal the drive system 32 to move using command data received through the communication system 28.

In step 808, the mobile robot 20 delivers the luggage 42 at the guest room. The guest, for example, may remove his/her luggage 42 from the platform 50. Alternatively, the mobile robot 20 may autonomously deliver the luggage 42. For example, the controller 38 may signal the manipulator system 34 to pick up the luggage 42 with one or more of the manipulator arms 73 using data received from the sensor system 24. The controller 38 may also or alternatively signal the manipulator system 34 to pick up the luggage 42 using command data received through the communication system 28. The controller 38 may subsequently signal the manipulator system 34 to place the luggage 42 onto a support surface (e.g., the floor or a stand) near or in the guest room.

In some embodiments, the mobile robot 20 electronically presents a message to the guest, for example, after delivering the luggage 42. This message may inquire as to whether the guest has any questions and/or whether the guest needs any additional assistance. If the guest does not have any questions and/or does not need any additional assistance, the guest may utilize the user interface 26 to dismiss the mobile robot 20. However, if the guest has a question(s) or needs assistance, the guest may use the user interface 26 to call a staff member of the lodging business.

Room Delivery Service

In step 900 of the method of FIG. 9, the mobile robot 20 receives a request to perform a hospitality service for the guest. This request may be provided (e.g., sent) from the guest, or alternatively from an intermediary such as a staff member of the lodging business who may receive an initial request from the guest. The guest may send the request from his/her mobile telephone (or any other electronic device) to the communication system 28, or to the remote computer system to be reviewed by the staff member. The request may be for one or more hospitality service articles 44 such as, for example, additional linens or toiletries to be delivered to the guest room. The request may also or alternatively be for room service, or any other hospitality service article(s) to be delivered to the guest room.

In step 902, the mobile robot 20 gathers the hospitality service articles 44 requested by the guest. The controller 38, for example, may signal the drive system 32 to autonomously move the mobile robot 20 to a supply closet (or a kitchen or any other destination) using data received from the sensor system 24. The controller 38 may also or alternatively signal the drive system 32 to move using command data received through the communication system 28.

Upon arriving at the supply closet, the controller 38 may signal the manipulator system 34 to open one of the drawers 46. The controller 38 may also signal the user interface 26 to electronically present a message to a staff member of the lodging business. This message may ask the staff member to load the requested hospitality service articles 44 into the open drawer 46. Once the requested hospitality service articles 44 are within the drawer 46, the mobile robot 20 may receive instructions through the user interface 26 from the staff member to close and/or secure the drawer 46 using the manipulator system 34 and/or the security system 36. In this manner, unauthorized individuals (e.g., other guests) may be unable to access the requested hospitality service articles 44.

In step 904, the mobile robot 20 transports the requested hospitality service articles 44 from the supply closet to the guest room. The controller 38, for example, may signal the drive system 32 to autonomously move the mobile robot 20 through the lodging business to the guest room using data received from the sensor system 24. The controller 38 may also or alternatively signal the drive system 32 to move using command data received through the communication system 28.

In step 906, the mobile robot 20 presents a message to the guest related to the requested hospitality service articles 44.

The controller 38, for example, may signal the user interface 26 to electronically present a message to the guest. This message may provide the guest instructions on how to access the requested hospitality service articles 44. For example, the message may indicate in which drawer 46 the requested hospitality service articles 44 are located. The message may also or alternatively indicate how the guest may identify himself/herself to the mobile robot 20 as the intended recipient of the requested hospitality service articles 44.

In step 908, the mobile robot 20 receives and verifies security information provided by the guest. The guest, for example, may swipe his/her keycard through the card reader 64 in response to seeing/hearing the message presented in the step 906. The controller 38 may receive data from the user interface 26 indicative of the room lock combination encoded on the keycard. The controller 38 may subsequently compare this encoded combination to a combination of record for the guest (security criteria) in order to determine whether the guest is the same guest who requested the hospitality service articles 44. The mobile robot 20, of course, may use various security techniques other than those described above to verify the identity of the guest. For example, the mobile robot 20 may receive a name from the guest, and/or an audible/typed alphanumeric password from the guest. The mobile robot 20 may also or alternatively scan a finger, a hand, an eye retinal and/or another body part of the guest, etc.

In step 910, the mobile robot 20 delivers the requested hospitality service articles 44 to the guest where, for example, the security information satisfies the security criteria. The controller 38, for example, may signal the security system 36 and/or the manipulator system 34 to unlock and/or open the drawer 46 to provide the guest access to the hospitality service articles 44.

In some embodiments, the mobile robot 20 may autonomously gather and/or deliver one or more of the hospitality service articles 44 without aid from a staff member and/or the guest. For example, the controller 38 may signal the manipulator system 34 to pick up one or more of the hospitality service articles 44 with one or more of the manipulator aims 73 using data received from the sensor system 24. The controller 38 may also or alternatively signal the manipulator system 34 to pick up one or more of the hospitality service articles 44 using command data received through the communication system 28. The controller 38 may subsequently signal the manipulator system 34 to place the hospitality service articles 44 into or onto a respective one of the item supports 22; e.g., into the drawer 46. Similarly, the controller 38 may signal the manipulator system 34 to deliver the luggage 42 and/or one or more of the hospitality service articles 44.

The mobile robot 20 may perform various hospitality services for the guest during his/her stay at the lodging business other than those described above. For example, the mobile robot 20 may perform at least one housekeeping service for the guest, or for a staff member (e.g., a housekeeper). The mobile robot 20, for example, may autonomously pick up or otherwise receive a bag of trash from outside of the guest room, or within the guest room. The mobile robot 20 may also or alternatively use one or more of the manipulator arms 73 to clean the guest room; e.g., vacuum and/or dust the guest room.

The mobile robot 20 may also or alternatively perform one or more concierge services for the guest. The guest, for example, may use the user interface 26 to request the mobile robot 20 to provide a recommendation for a restaurant located, for example, near the lodging business or a local attraction. This request may also include other search criteria such as, for example, which type of cuisine the guest is interested in eating and/or an average meal price range. Based on this request, the controller 38 may determine which restaurants satisfy the guest's location, cuisine and cost search criteria. The controller 38 may determine which of those restaurants have received the highest recommendations from, for example, other guests, staff members, published restaurant reviews, etc. The controller 38 may subsequently signal the user interface 26 to present the guest with a list of the recommended restaurants that satisfy the search criteria. The controller 38 may also signal the user interface 26 to present directions to one or more of the recommended restaurants.

Upon reviewing the list of recommended restaurants, the guest may use the user interface 26 to request that the mobile robot 20 makes him/her a reservation at one of the restaurants. In response to this request, the controller 38 may signal the communication system 28 to send a reservation request to a computer system of the selected restaurant. Alternatively, the controller 38 may signal the communication system 28 to call the selected restaurant such that the guest may make his/her own reservation using the user interface 26 and the communication system 28 as a telephone. Still alternatively, the mobile robot 20 may forward the request to the remote computer system such that a staff member of the lodging business may make the reservation on behalf of the guest. The mobile robot 20, of course, is not limited to any particular method for making a reservation.

The mobile robot 20, for course, may perform concierge services other than those described above. The mobile robot 20, for example, may recommend shows (e.g., plays, musicals, concerts, comedy acts, etc.) taking place at or near the lodging business. The mobile robot 20 may also issue or otherwise acquire tickets to the recommended shows, etc.

Check Out & Porter Services

In step 1000 of the method of FIG. 10, the mobile robot 20 receives a request to perform a check out service and/or a porter service for the guest at a certain time and/or on a certain day, or as soon as the mobile robot 20 is available. This request may be received from the guest. The guest may, for example, electronically send the request from his/her mobile telephone (or any other electronic device) to the communication system 28, or input the request using the user interface 26. Alternatively, the request may be received from an intermediary such as a staff member of the lodging business who receives an initial request from the guest.

In step 1002, mobile robot 20 moves to the guest room for an arrival at or proximate to the requested time and/or date. The controller 38, for example, may calculate an approximate transit time from its current location or a predicted start location (e.g., another guest's room) to the guest room. Based on this transit time, the controller 38 may determine a departure time for when the mobile robot 20 should start moving to the guest room. The controller 38 may subsequently signal the drive system 32 to autonomously move the mobile robot 20 from its current location to the guest room based on the departure time and using data received from the sensor system 24. The controller 38 may also or alternatively signal the drive system 32 to move using command data received through the communication system 28.

In step 1004, the mobile robot 20 greets the guest at the guest room. The controller 38, for example, may signal the user interface 26 to present a message in order to announce its arrival at the guest room. The controller 38 may also or alternatively signal the user interface 26 to present a message to the guest that provides directions on how to check out from the lodging business using the mobile robot 20.

In step 1006, the mobile robot 20 checks the guest out from the lodging business. The controller 38, for example, may receive check out information from the guest through the user interface 26. The guest may input this check out information using the touch screen 60, the card reader 64 and/or verbally through the microphone of the user interface 26. Alternatively, the guest may input the check out information using another electronic device (e.g., a mobile phone, a personal digital assistance (PDA), etc.), which sends the check out information to the communication system 28. The check out information may include the guest identification (ID) information, the guest payment information, and/or any other type of information.

The controller 38 may store the check out information in the memory 30. The controller 38 may also signal the communication system 28 to bill the account (e.g., credit or debit card) in the guest payment information. The controller 38 may also or alternatively send check out data to the remote computer system, for example, to update the central database for the lodging business and/or request the account on the guest payment information to be billed. The check out data may be indicative of at least some of the check out information. The check out data may also or alternatively be indicative of an approximate time of departure of the guest from the lodging business; e.g., when the guest began the check out process.

The mobile robot 20 may receive the key (e.g., keycard) that was issued to the guest during the check in. The controller 38, for example, may signal the manipulator system 34 to open one of the drawers 46 which holds returned keycards. The controller 38 may subsequently close the drawer 46 to prevent un-authorized individuals from accessing the returned keycard. Alternatively, the guest may insert the keycard into a return slot 80 (see FIG. 3) in, for example, one of the drawers 46. The controller 38 may receive data from the sensor system 24 indicative of the keycard being inserted into the slot 80. The controller 38 may also or alternatively receive data from the sensor system 24 indicative of whether the keycard inserted into the slot 80 is the originally issued keycard where, for example, a card reader is configured in the drawer 46 with the slot 80.

In step 1008, the mobile robot 20 receives one or more parcels of the luggage 42. The guest, for example, may place his/her luggage 42 onto the platform 50. Alternatively, the mobile robot 20 may autonomously gather the luggage 42. For example, the controller 38 may signal the manipulator system 34 to pick up the luggage 42 with one or more of the manipulator arras 73 using data received from the sensor system 24. The controller 38 may also or alternatively signal the manipulator system 34 to pick up the luggage 42 using command data received through the communication system 28. The controller 38 may subsequently signal the manipulator system 34 to place the luggage 42 onto the platform 50. Alternatively, the end effectors 54 may continue to hold the luggage 42 where, for example, the platform 50 is substantially full or the mobile robot 20 does not include a platform as illustrated in FIG. 5.

In step 1010, the mobile robot 20 transports the luggage 42 from the guest room to a departure location; e.g., the greeting location, near a guest vehicle, etc. The controller 38, for example, may signal the drive system 32 to autonomously move the mobile robot 20 through the lodging business to the departure location using data received from the sensor system 24. The controller 38 may also or alternatively signal the drive system 32 to move using command data received through the communication system 28.

In step 1012, the mobile robot 20 delivers the luggage 42 at the departure location. The guest, for example, may remove his/her luggage 42 from the platform 50. Alternatively, the mobile robot 20 may autonomously deliver the luggage 42. For example, the controller 38 may signal the manipulator system 34 to pick up the luggage 42 with one or more of the manipulator aims 73 using data received from the sensor system 24. The controller 38 may also or alternatively signal the manipulator system 34 to pick up the luggage 42 using command data received through the communication system 28. The controller 38 may subsequently signal the manipulator system 34 to place the luggage 42 onto a support surface (e.g., the floor or rack) near or in the departure location.

In some embodiments, the mobile robot 20 may electronically present a message to the guest at the departure location. This message may inquire as to whether the guest has any questions and/or whether the guest needs any additional assistance. If the guest does not have any questions and/or does not need any additional assistance, the guest may utilize the user interface 26 to dismiss the mobile robot 20. However, if the guest has a question(s) or needs assistance, the guest may use the user interface 26 to call a staff member of the lodging business. The guest, for example, may call a staff member for assistance in loading the luggage 42 into his/her vehicle where, for example, the mobile robot 20 does not include the manipulator aims 73.

In some embodiments of the methods of FIGS. 8 to 10, the mobile robot 20 may take an image of the recipient of the luggage 42 and/or the hospitality service articles 44 using the camera 58. The image may be taken before delivering the luggage 42 and/or the hospitality service articles 44 in order to verify the recipient is the intended guest using, for example, facial recognition. The image may also or alternatively be taken during and/or after the delivery to record who actually received the luggage 42 and/or the hospitality service articles 44. Similarly, a voice of the recipient may be recorded before, during and/or after delivery of the luggage 42 and/or hospitality service articles 44 to verify the recipient's identity and/or keep a record of the recipient. The mobile robot 20, of course, may use various security techniques other than those described above to verify the recipient as the intended recipient and/or record mobile robot 20/guest transactions.

It is to be understood that the terminology used herein is used for the purpose of describing specific embodiments, and is not intended to limit the scope of the present invention. It should be noted that as used herein, the singular foal's of "a", "an" and "the" include plural references unless the context clearly dictates otherwise. In addition, unless defined otherwise, all technical and scientific terms used herein have the same meaning as commonly understood by one of ordinary skill in the art to which this invention belongs.

Although the description above contains many specific examples, these should not be construed as limiting the scope of the embodiments of the present disclosure, but as merely providing illustrations of some of the presently preferred embodiments of the present invention. It will be appreciated by those skilled in the art that changes could be made to the embodiments described above without departing from the broad inventive concept thereof. It is to be understood therefore that this disclosure is not limited to the specific embodiments disclosed herein, but it is intended to cover modifications within the spirit and scope of the embodiments of the present disclosure. Accordingly, the present invention is not to be restricted except in light of the attached claims and their equivalents.

I claim:

1. An apparatus for operating in a facility, the apparatus comprising:
    an autonomous mobile robot comprising a communication system, a user interface, an item support, a security system, a drive system, a manipulator system having at least one robot arm for retrieving and placing items on the item support, and a controller integrally formed with the autonomous mobile robot, wherein the autonomous mobile robot is configured to receive information related to transporting an item from a first location to a second location to yield a transportation of the item, wherein:
        the item support is integrally formed with the autonomous mobile robot and is configured to support the item during the transportation of the item;
        the security system is configured to secure the item in the item support to prevent unauthorized access to the item during the transportation of the item from the first location to the second location, and the security system is further configured to provide access to the item at the second location to an authorized person and to ensure the item remains with the autonomous mobile robot at all times such that the item is at least discoverable at any time without resorting to any additional tracking mechanisms and the item is autonomously moved at any time to any place within the facility;
        the drive system is configured to move the autonomous mobile robot in order to transport the item from the first location to the second location; and
        the controller is configured to control operation of the mobile robot to transport the item from the first location to the second location without any outside human intervention or human input after initial programming and user input information is provided.

2. The apparatus of claim 1, wherein the facility comprises one of a resort, a hotel, a motel, an inn, a resort, an airport, a bus station, a railroad station, a restaurant, a bar, a spa, a theme park, an arena, a stadium, a government building, and a warehouse.

3. The apparatus of claim 1, wherein one or more of the user interface and the communication system are configured to receive user information related to an individual, and wherein the mobile robot is configured to check in the individual with or check out the individual from the facility based on the user information.

4. The apparatus of claim 1, wherein the mobile robot is configured to issue an individual a key to a lock at the facility, and the key is configured as a keycard.

5. The apparatus of claim 1, wherein the mobile robot is configured to issue an individual a key to a lock at the facility, and the key is configured as a mechanical key.

6. The apparatus of claim 1, wherein the mobile robot is configured to issue an individual a key to a lock at the facility, and the key is configured as an electronic key.

7. The apparatus of claim 1, wherein the mobile robot is further configured to bill an individual for a service.

8. The apparatus of claim 1, wherein the security system includes an electronically and/or fluidly actuated lock.

9. The apparatus of claim 1, wherein the controller is configured to signal the security system to provide access to the item to the authorized person at the second location.

* * * * *